(12) United States Patent
Foo et al.

(10) Patent No.: US 9,975,510 B2
(45) Date of Patent: May 22, 2018

(54) HYBRID VEHICLE/PEDESTRIAN IMPACT DETECTING METHOD AND APPARATUS

(71) Applicant: TRW AUTOMOTIVE U.S. LLC, Livonia, MI (US)

(72) Inventors: Chek-Peng Foo, Ann Arbor, MI (US); Neil G. Murray, Jr., Wixom, MI (US); Johannes Konle, Constance (DE); Dion Parker, Livonia, MI (US); Luis F. Sanchez, Commerce Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 147 days.

(21) Appl. No.: 14/768,736

(22) PCT Filed: May 21, 2013

(86) PCT No.: PCT/US2013/041932
§ 371 (c)(1),
(2) Date: Aug. 18, 2015

(87) PCT Pub. No.: WO2013/177103
PCT Pub. Date: Nov. 28, 2013

(65) Prior Publication Data
US 2016/0039378 A1 Feb. 11, 2016

Related U.S. Application Data

(63) Continuation of application No. PCT/US2012/038982, filed on May 22, 2012.
(Continued)

(51) Int. Cl.
*B60R 21/0136* (2006.01)
*B60R 19/48* (2006.01)
(Continued)

(52) U.S. Cl.
CPC ........ *B60R 21/0136* (2013.01); *B60R 19/483* (2013.01); *B60R 21/34* (2013.01); *B60R 2021/01013* (2013.01)

(58) Field of Classification Search
None
See application file for complete search history.

(56) References Cited

U.S. PATENT DOCUMENTS 7,605,691 B2 * 10/2009 Nonaka ............... B60R 21/0136
340/425.5
9,221,414 B2 * 12/2015 Schondorf ............ B60R 19/483
(Continued)

FOREIGN PATENT DOCUMENTS

GB  2 396 942 A  7/2004
JP  2009-196463 A  9/2009

OTHER PUBLICATIONS

International Search Report for corresponding PCT/US2013/041932, completed Sep. 3, 2013 by Blaine R. Copenheaver of the ISA/US.

*Primary Examiner* — Redhwan K Mawari
*Assistant Examiner* — Edward Torchinsky
(74) *Attorney, Agent, or Firm* — Tarolli, Sundheim, Covell & Tummino LLP

(57) ABSTRACT

An apparatus detects a vehicle/pedestrian impact event by sensing impact events near a forward location of a vehicle using a multi-port pressure sensor and acceleration sensors. The multi-port pressure sensor includes multiple pressure sensors in a unified housing, connected via individual pressure ports to multiple impact-sensing hoses mounted along the vehicle bumper. An acceleration sensor may also be installed in the same housing. A single electrical connector provides connection to the multiple pressure sensors and also the acceleration sensors.

19 Claims, 14 Drawing Sheets

Related U.S. Application Data

(60) Provisional application No. 61/776,225, filed on Mar. 11, 2013.

(51) Int. Cl.
    *B60R 21/34*     (2011.01)
    *B60R 21/01*     (2006.01)

(56) References Cited

U.S. PATENT DOCUMENTS

| | | |
|---|---|---|
| 9,371,050 B2 * | 6/2016 | Schondorf ............ B60R 19/483 |
| 2007/0090931 A1 | 4/2007 | Hawes et al. |
| 2008/0164986 A1 | 7/2008 | Takafuji |
| 2009/0020353 A1 | 1/2009 | Kiribayashi |
| 2011/0107835 A1 | 5/2011 | Campbell et al. |
| 2011/0282553 A1 | 11/2011 | Foo et al. |
| 2015/0203068 A1 * | 7/2015 | Foo ..................... B60R 21/38 |
| | | 701/1 |
| 2015/0268261 A1 * | 9/2015 | Murray, Jr. ........ H01R 13/6683 |
| | | 73/493 |

* cited by examiner

HYBRID VEHICLE/PEDESTRIAN IMPACT DETECTING METHOD AND APPARATUS

RELATED APPLICATION

This application is a U.S. National Stage under 35 USC 371 patent application, claiming priority to Serial No. PCT/US2013/041932, filed on 21 May 2013; which claims priority from claims priority from PCT/US2012/038982, filed 22 May 2012 and U.S. Provisional Patent Application Ser. No. 61/776,225, filed 11 Mar. 2013, the subject matter of both which is incorporated hereby incorporated by reference in its entirety.

TECHNICAL FIELD

The present invention relates to a protection system and, more particularly, to a hybrid vehicle/pedestrian impact detecting apparatus.

BACKGROUND OF THE INVENTION

Air bags and other devices for helping to protect a vehicle occupant during a vehicle event such as a crash, roll-over, etc., are known. To detect such a vehicle event, one or more event sensors are mounted to the vehicle and provide signals indicative of sensed vehicle event conditions for which actuation of the protection device may be desired. The event sensors are connected to an electronic controller that evaluates the event sensor signals using appropriate event metrics to monitor and determine if a particular event is occurring, e.g., a vehicle crash condition. Upon determining the occurrence of a particular type of vehicle event by the electronic controller, the vehicle occupant protection devices, e.g., air bags, inflatable side curtains, etc., are actuated.

Pedestrian protection systems have been proposed to aid in reducing pedestrian injury when the pedestrian is struck by a moving vehicle (a "vehicle/pedestrian impact"). Some proposed pedestrian protection systems include a sensor mounted in the vehicle bumper. If the sensor detects an impact with a pedestrian, an actuatable device is actuated to mitigate the impact effect. Such actuatable devices include, for example, actuators to raise the trailing end of the hood. Actuatable forward mounted air bags have also been proposed to mitigate vehicle/pedestrian impact effects.

One known approach for detecting impacts with pedestrians involves a closed, gas-filled, compressible tube disposed along the length of the vehicle's front bumper. In the event of an impact, the pressure of the gas in the tube will spike because of compression of the tube. Pressure sensors at one or both ends of the tube detect the spike in pressure, and the controller responds by deploying the pedestrian protective device.

A variety of pedestrian impact sensors and vehicle crash sensors may all be arrayed in the front end of the vehicle. Such sensor systems typically require multiple wiring harnesses and fastening systems that add weight and complexity on the vehicle.

It would be beneficial if the front impact sensing systems could be simplified while also improving the performance of the sensors.

SUMMARY OF THE INVENTION

In accordance with one aspect of the present invention, apparatus is provided for detecting an impact of a pedestrian or other object on a bumper of a vehicle. The apparatus includes a plurality of closed, gas filled hoses, each hose being disposed proximal to the vehicle bumper and running generally parallel to the long dimension of the bumper. Each hose has a sensing end and a non-sensing end, with the sensing ends of all of the hoses being disposed in proximity to one another. A plurality of gas pressure sensors are also provided, with each sensor being operatively attached to the sensing end of an associated one of the plurality of hoses whereby all of said plurality of gas pressure sensors are in proximity of one another.

In accordance with another aspect of the present invention, apparatus is provided for use in detecting an impact of a pedestrian or other object on a vehicle. The apparatus comprises a closed housing, a printed circuit board fixed in the closed housing, at least two pressure sensors mounted on the printed circuit board such that the pressure sensors each face the same side of the closed housing, an electrical connector accessible external to the housing for providing electrical communication between the printed circuit board and other electrical systems external to the housing, and at least two pressure ports formed on the housing, each port being in gas communication with a respective one of the pressure sensors and also adapted for connection to impact sensing hoses that are external to the housing whereby pressure changes in the hoses will be communicated to the pressure sensors via the ports.

In accordance with still another aspect of the present invention, apparatus is provided for detecting a vehicle/pedestrian impact. The apparatus includes a least one acceleration sensor mounted near a forward location of a vehicle for providing an associated acceleration signal indicative of an impact event. At least one multi-channel pressure sensor is provided having a plurality of pressure hoses connected to it. The plurality of pressure hoses are mounted at associated different locations along a forward structure of the vehicle. Each pressure hose provides an associated pressure indication to the multi-channel pressure sensor of an impact event. The multi-channel pressure sensor provides an associated electrical signal indicative of an impact event encountered by any of the pressure hoses. A controller determines if a vehicle/pedestrian impact event has occurred in response to the acceleration signal and the associated electrical signal from the multi-channel pressure sensor. The controller provides an actuation control signal in response thereto. The at least one multi-channel pressure sensor includes a housing having a printed circuit board mounted therein and a plurality of pressure sensors mounted to said printed circuit board, each pressure hoses being operatively coupled to an associated one of the pressure sensors mounted on said printed circuit board.

DETAILED DESCRIPTION OF THE DRAWINGS

The foregoing and other features and advantages of will become apparent to one skilled in the art upon consideration of the following description and the accompanying drawings, in which.

DETAILED DESCRIPTION OF EXEMPLARY EMBODIMENTS

Pedestrian protection systems require some mechanism for detecting the impact of the pedestrian against the vehicle so that the protection systems can be triggered effectively. One known mechanism of fulfilling this impact detection function employs a hose filled with a gas, together with one or two pressure sensors.

Figure 1:
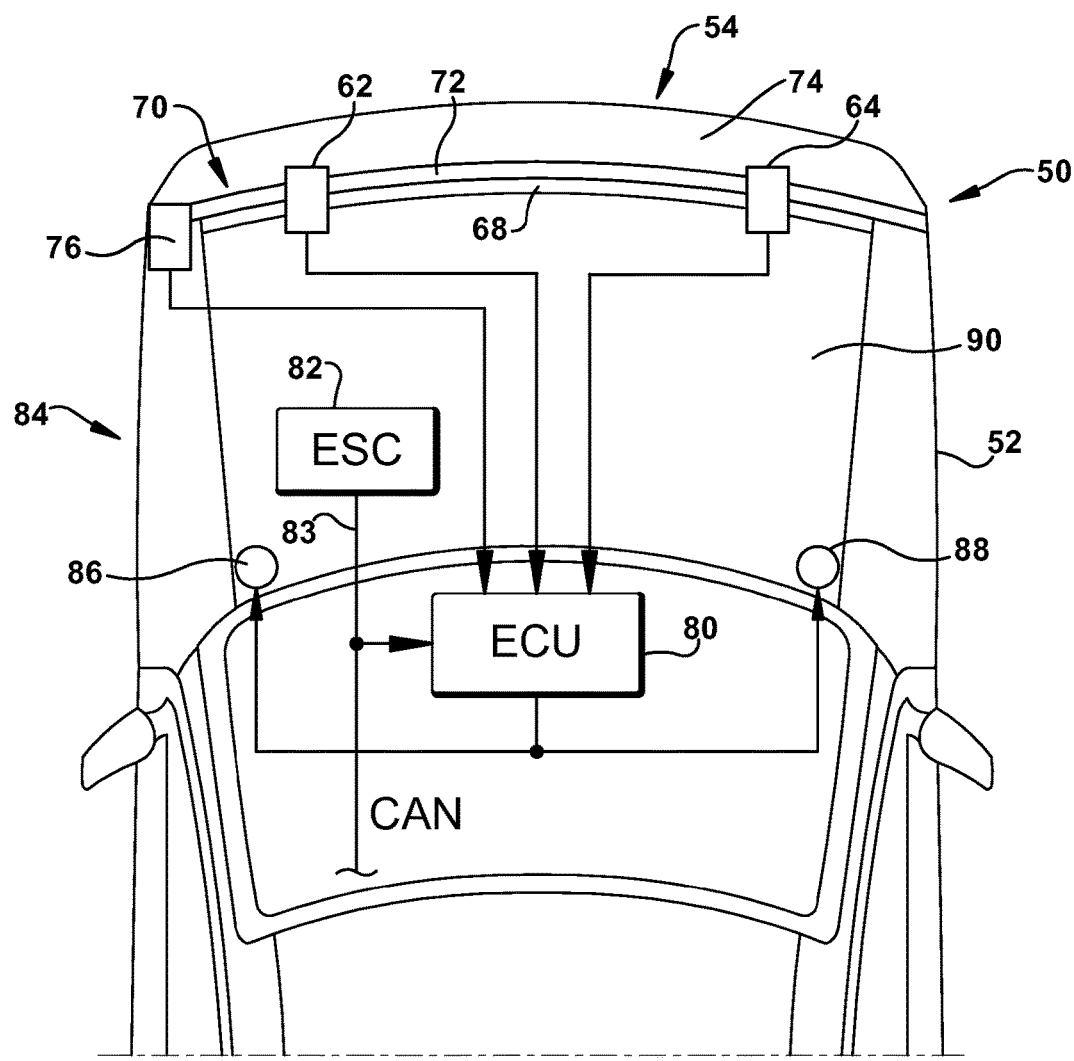
FIG. 1 is a schematic plan view of a vehicle pedestrian impact detection system employing, among other sensors, a single hose and one conventional pressure sensor.

Referring to FIG. 1, a detection apparatus 50 is provided for detecting a vehicle/pedestrian impact event. The detection apparatus 50 includes a plurality of sensors 54 mounted at the front portion of a vehicle 52. The sensor set 54 include a plurality of acceleration sensors 62, 64 mounted in a spaced apart fashion to a forward cross-member 68 (e.g., a bumper cross-beam) of the vehicle 52 so as to be positioned at a left front location and a right front location, respectively, of the vehicle 52. A sensing architecture that uses acceleration sensors mounted near the front of a vehicle for vehicle/pedestrian impact detection can be found in co-pending patent application U.S. Ser. No. 12/778,505 filed May 12, 2010 to Foo et al. (U.S. Patent Application Publication No. 2011/0282553 published Nov. 17, 2011) and in co-pending PCT application No. PCT/US2012/038982 filed May 22, 2012, both of which are hereby fully incorporated herein by reference.

The acceleration sensors 62, 64 are multi-axis acceleration sensors ("MAS"), although single-axis acceleration sensors ("SAS") could alternatively be used. The acceleration sensors 62, 64 each provide an associated electrical signal having electrical characteristics (e.g., frequency, amplitude, etc.) indicative of a sensed acceleration as a result of an impact event between the vehicle 52 and an object such as a pedestrian (not shown). This type of impact event is referred to herein as a "vehicle/pedestrian impact event."

The sensor set 54 further includes a pressure sensor assembly or arrangement 70, whose general form is known per se. The pressure sensor assembly 70 includes a pressure tube or hose 72 secured to the front of the forward cross-member 68. The front bumper structure of the vehicle 52 includes energy absorbing foam 74 that contacts a forward facing portion of the pressure hose 72. The pressure sensor assembly 70 further includes a pressure sensor 76 operatively connected to and in operative fluid communication with either end of the pressure hose 72. The pressure hose 72 is a sealed tube (i.e., hollow) filled with a gas such as air. The closed hollow is in fluid communication with the pressure sensors 76.

If the vehicle bumper is pushed in, as may occur when a pedestrian is hit by the vehicle 52, the energy absorbing foam 74 will push against the pressure hose thereby increasing the pressure inside of the pressure hose 72. The pressure against the hose during a vehicle/pedestrian impact event squeezes the hose and decreases the hose volume which, in turn, increases air pressure within the closed hose. The increase in pressure within the pressure hose 72 will be sensed by the pressure sensor 76. The pressure sensor 76 provides electrical output signals having an electrical characteristic indicative of sensed pressure, i.e., the pressure within the hose 72. The pressure sensor 76 will be referred to herein as single channel pressure ("SCP") sensor.

Each of the event sensors 62, 64, 76 is electrically connected to an electronic control unit ("ECU") 80 for monitoring and processing the accelerometer signals from sensors 62, 64 and the pressure signal from sensor 76. The ECU 80 may be a microcontroller, a microprocessor, discrete circuitry, and/or an application specific integrated circuit ("ASIC"). The ECU 80 may be located within the cabin of the vehicle 52 or other area of the vehicle. The ECU 80 is connected to the accelerometers 62, 64 and pressure sensor 76 via a direct electrical connection, via a communication bus, via any other wiring arrangement, or even wirelessly. The output signal from the acceleration sensor 62 is referred to herein as PPS_MAS Left. The output signal from the acceleration sensor 64 is referred to herein as PPS_MAS Right. The output signal from the pressure sensor 76 is referred to herein as PPS_SCP.

The vehicle 52 may also include an electronic stability control ("ESC") system 82 that provides the ECU 80 with electrical signals indicative of certain other sensed vehicle operating conditions such as a vehicle speed signal. The sensor signals from the ESC system 82 can either be directly connected to the ECU 80, or sensor signals from the ESC can be communicated to the ECU 80 via the vehicle's controller area network ("CAN") Bus 83. Alternatively, a separate vehicle speed sensor could be provided for monitoring vehicle speed and sending a vehicle speed signal directly to the ECU 80.

The ECU 80 is further electrically connected to an actuatable vehicle/pedestrian impact mitigation device 84. The actuatable impact mitigation device 84 includes actuators 86, 88 located at the trailing end of the vehicle hood 90 so that, when actuated by the ECU 80, the actuators 86, 88 lift the trailing end of the hood 90 upward thereby allowing the slanted hood, which is spring-loaded in its actuated position, to mitigate pedestrian injury during a vehicle/pedestrian impact event. The actuators 86, 88 can be actuatable via, for example, pyrotechnics. Other means for actuating the actuators 86, 88 are also contemplated. Also, rather than hood actuators for vehicle/pedestrian impact mitigation, other actuatable devices could be used such as forward mounted air bags.

Figure 2:
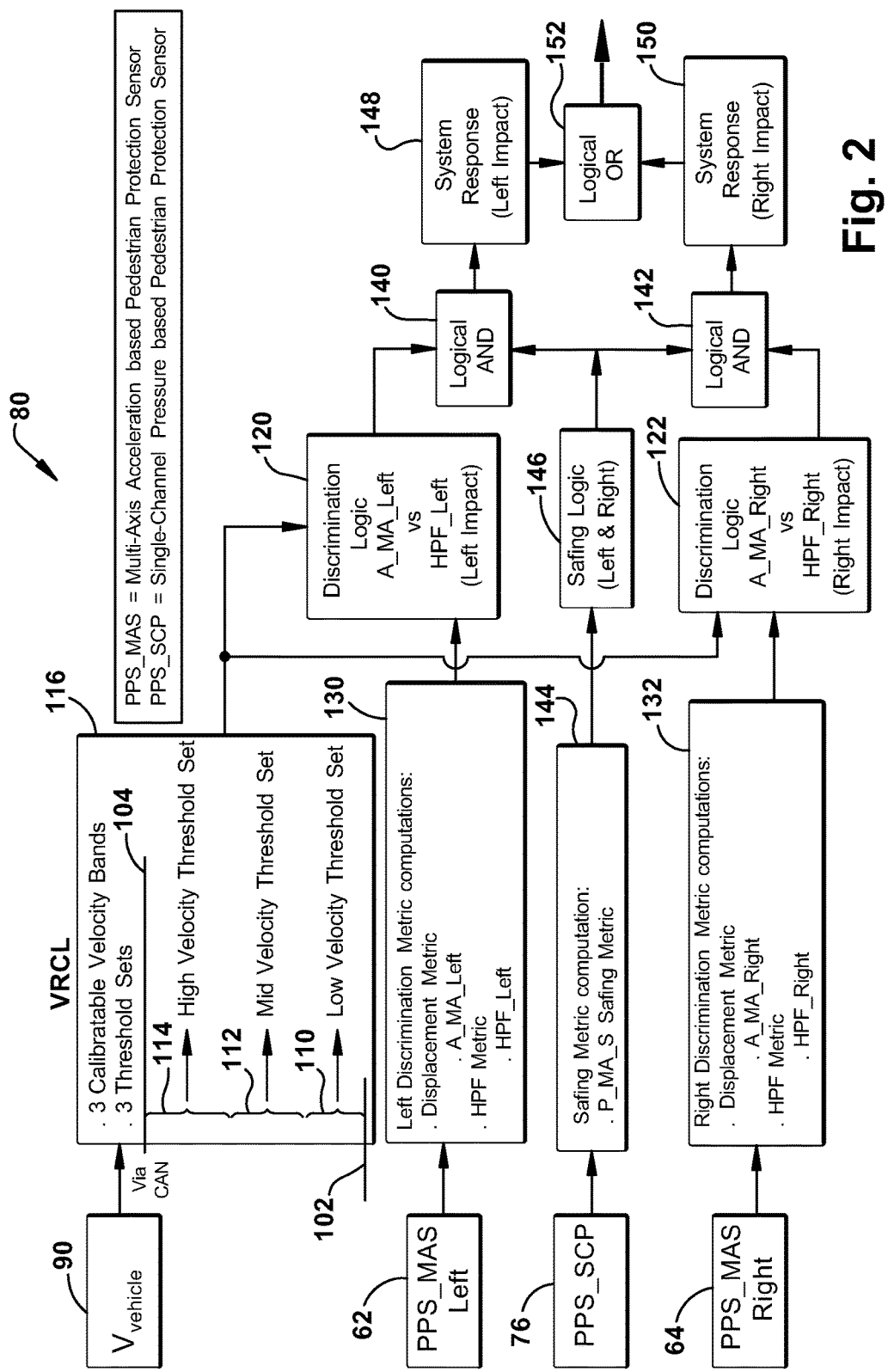
FIG. 2 is a functional block diagram showing a portion of the control logic used by the electronic control unit of FIG. 1 for detection of a vehicle/pedestrian impact.

Referring to FIG. 2, the control logic performed by the ECU 80 is shown. This control logic determines if there is a vehicle/pedestrian impact event occurring by combining information from the acceleration sensors 62, 64 and the pressure sensor 76, i.e., a determination based on a hybrid sensor arrangement combining acceleration and pressure. The vehicle speed signal from the ESC system 82 is also monitored by the ECU 80. One of a plurality of sets of threshold values is selected in response to the monitored vehicle speed value as part of the vehicle/pedestrian impact determination. The vehicle speed being between a minimum vehicle speed value 102 and a maximum speed value 104 is classified by velocity range classifier logic ("VRCL") 116 of the ECU 80 as falling within, for example, one of three specific speed ranges. The speed or velocity values that define a particular speed range may overlap with adjacent speed range(s). Each speed range has associated therewith, a set of threshold values that are used in the control process performed by the ECU 80 for deciding whether to actuate the actuatable impact mitigation device 84, i.e., determining if a vehicle/pedestrian impact event is occurring. If the monitored vehicle speed is less than a minimum vehicle speed 102, for example 20 KPH, or if the monitored vehicle speed is greater than the maximum vehicle speed 104, for example 50 KPH, the ECU 80 will not permit actuation of the actuatable pedestrian impact mitigation device 84 regardless of the values of the signal outputs from the sensors 62, 64, and 76. Therefore, it should be appreciated that each of the speed ranges relevant for possible actuation of the actuatable devices all fall between the minimum 102 and maximum 104 vehicle speed values.

As mentioned, the sensed vehicle speed between the minimum vehicle speed 102 and the maximum vehicle speed 104 is divided or classified into one of the predetermined number of discrete speed ranges, e.g., a low-velocity range or set 110, a mid-velocity range or set 112, or a high velocity range or set 114. The mid-velocity range 112 values and the low-velocity range 110 values can have overlapping velocity values, and the mid-velocity range 112 values and the high-velocity range 114 values can have overlapping velocity values. The classification of the monitored vehicle velocity value into one of the velocity ranges by the velocity range classifier logic 116 establishes a threshold value set used in later logic processing described below. If the vehicle speed falls in an overlap velocity range area, threshold sets associated with each of the velocity ranges are used by the ECU 80 in its discrimination determination process with the results of the determinations being logically OR'ed. The threshold value set(s) selected in response to the velocity range classifier logic 116 is used in a discrimination determination functions (or discrimination logic) 120 and 122 of the ECU 80.

The ECU 80 determines acceleration metric values from the outputs PPS_MAS Left and PPS_MAS Right of the acceleration sensors 62, 64, respectively, using metric computation functions 130, 132, respectively. Specifically, the output signal from each of the accelerometers 62, 64 is monitored by the metric computation functions 130, 132, respectively, and associated displacement values are determined. The displacement values are determined using a moving average value of the acceleration signals PPS_MAS Left and PPS_MAS Right over a time widow. The moving average value of the acceleration from the PPS_MAS Left sensor 62 over the time window is referred to as A_MA_Left and is determined in left discrimination function 130. The moving average value of the acceleration from the PPS_MAS Right sensor 64 over the time window is referred to as A_MA_Right and is determined in discrimination function 132. Displacement values (double integral of acceleration) are then determined using the A_MA_Left and A_MA_Right values within the discrimination functions 130, 132, respectively. In addition to determining the displacement values based on each of the left and right acceleration signals, an impact energy value is also determined based upon each of the acceleration sensor signals from sensors 62, 64. The determined impact energy values are based on the associated acceleration sensor signals within a predetermined frequency range. The impact energy values are referred to as HPF_Left and HPF_Right. The discrimination logic functions 120 and 122 compare each determined displacement metric value A_MA_Left and A_MA_Right as a function of the determined impact energy HPF_Left and HPF_Right, respectively, against the threshold sets established by the velocity range classifier logic 116. The output of each of the discrimination logic functions 120 and 122 is electrically connected to one input of logic AND functions 140, 142, respectively.

In the discrimination logic functions 120, 122, each of the two determined displacement metric values as a function of impact energy is compared against a threshold set (two threshold sets if the vehicle speed falls within an overlap portion of the speed ranges) selected from the velocity range classifier logic 116. If the vehicle velocity value does fall within overlapped speed ranges, the comparisons of displacement as a function of impact energy against the threshold sets from both speed ranges are logically OR'ed. The discrimination logic functions 120, 122 determine if a vehicle/pedestrian impact event, as sensed by the associated acceleration sensor 62, 64, respectively, is above a predetermined value In another portion of the control logic shown in FIG. 2, the output signal PPS_SCP from the pressure sensor 76 is processed by associated metric computation function 144. The value determined by the metric computation functions 144 is a moving average value of the pressure over a time window and is referred to herein as P_MA_S. The determined pressure moving average P_MA_S is compared against an associated fixed threshold in a safing logic function 146 to determine if a vehicle/pedestrian impact event, as sensed by the pressure sensor 76, is above a predetermined value.

The output of the resultant comparison performed in the safing logic function 146 is connected to the other (the second) input of each of the logical AND functions 140, 142. The output of the logic AND function 140 represents a system response 148 for left side impacts and the output of the logic AND function 142 represents a system response 150 for right side impacts. The two system responses 148 and 150 are logically OR'ed in logic OR function 152. The output of the logic OR function 152 is used as the actuator control signal for the actuators 86, 88. In effect, the pressure sensor 76 is used as a safing function that is AND'ed with the discrimination determinations based on the left and right sensed accelerations. If certain displacement metric values (left or right) as a function of their associated determined impact energy value is greater than a predetermined threshold and a pressure metric value is greater than a predetermined amount, the actuators 86, 88 are actuated.

Figure 3:
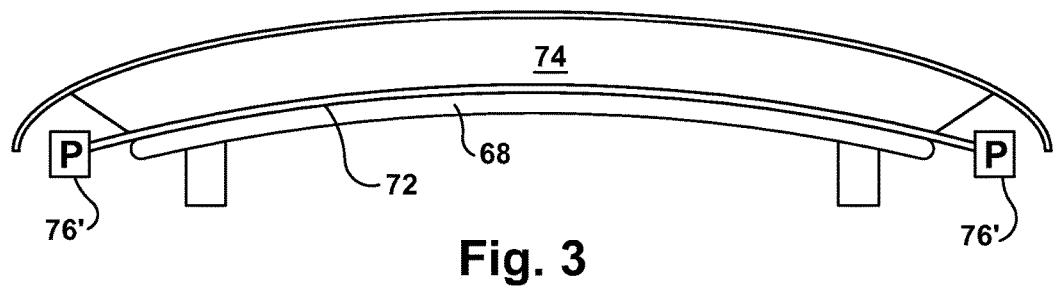
FIG. 3 is a simplified plan illustration of a version of the FIG. 1 pressure sensing system that uses two pressure sensors on opposite ends of the impact detection hose.
Figure 4:
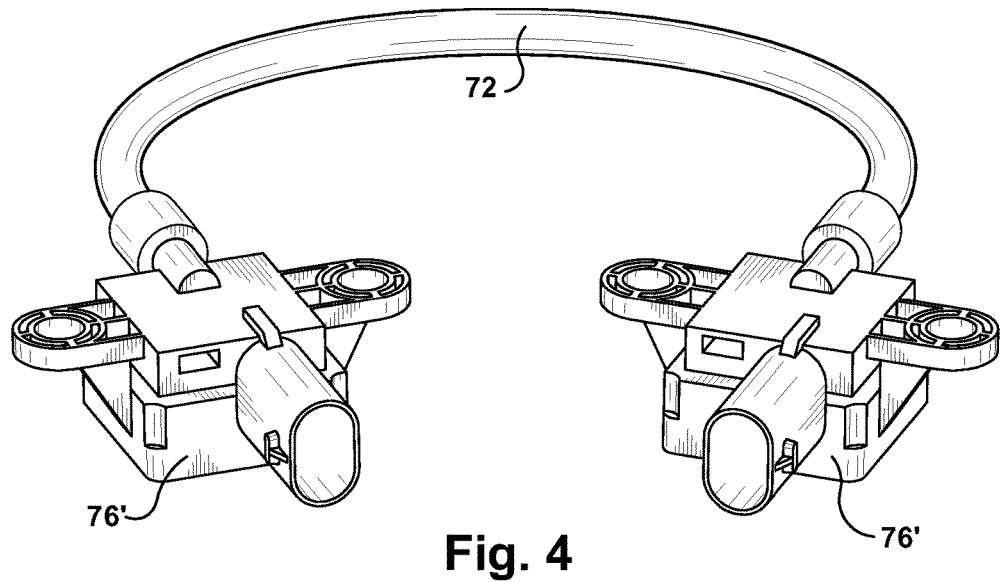
FIG. 4 is a perspective illustration of just the hose and pressure sensors of the FIG. 3 system.

An alternative form of the pressure sensing arrangement of FIG. 1 would include pressure sensors 76' at either end of the hose 72, as illustrated in FIGS. 3 and 4. In such a system, the sensors would still be single channel pressure sensors, as in the arrangement of FIG. 1. Also, the volume within the hose would be as large as in the FIG. 1 version, whereby a give compression of the hose would result in the same pressure spike in the FIG. 3 version as in the FIG. 1 version.

Figure 5:
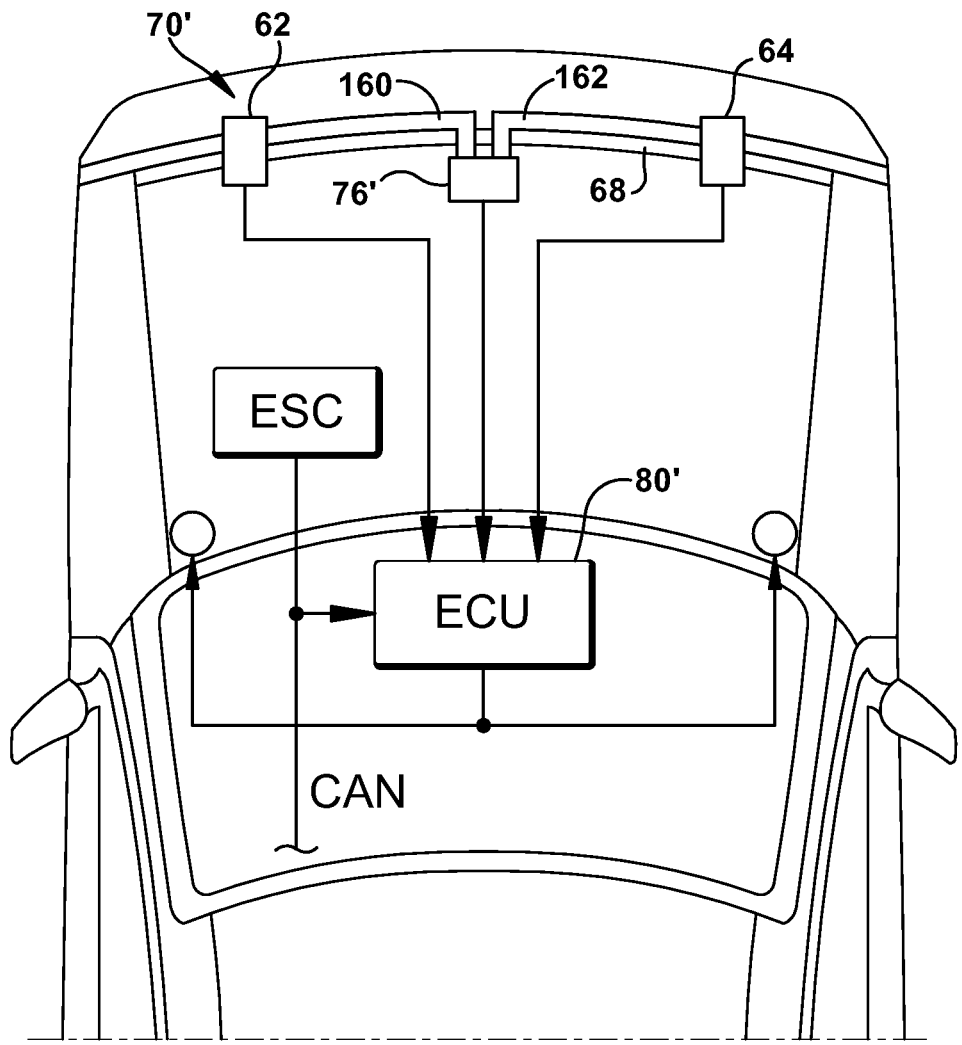
FIG. 5 illustrates a vehicle/pedestrian impact detection device utilizing a multi-channel pressure sensor in accordance with the present invention.

Referring to FIG. 5, a second sensor system architecture having sensors 70' is shown. In accordance with this example embodiment, acceleration sensors 62, 64 are mounted to the forward cross-member 68 as previous described. A multi-channel pressure sensor 76' ("PPS_MCP") is connected to two separate pressure hoses 160 left and 162 right. The pressure sensor 76' is a dual channel pressure sensor. In this way, the pressure sensor 76' can sense pressures from impact events on both the left and right sides of the vehicle and can provide both a left pressure signal (PPS_MCP Left) and a right pressure signal (PPS_MCP Right) to the ECU 80' for processing.

A more detailed description of hardware and electrical features of the multi-channel pressure ("MCP") sensor 76' in accordance with the present invention will be provided hereafter with respect to FIGS. 12-16, below.

Figure 6:
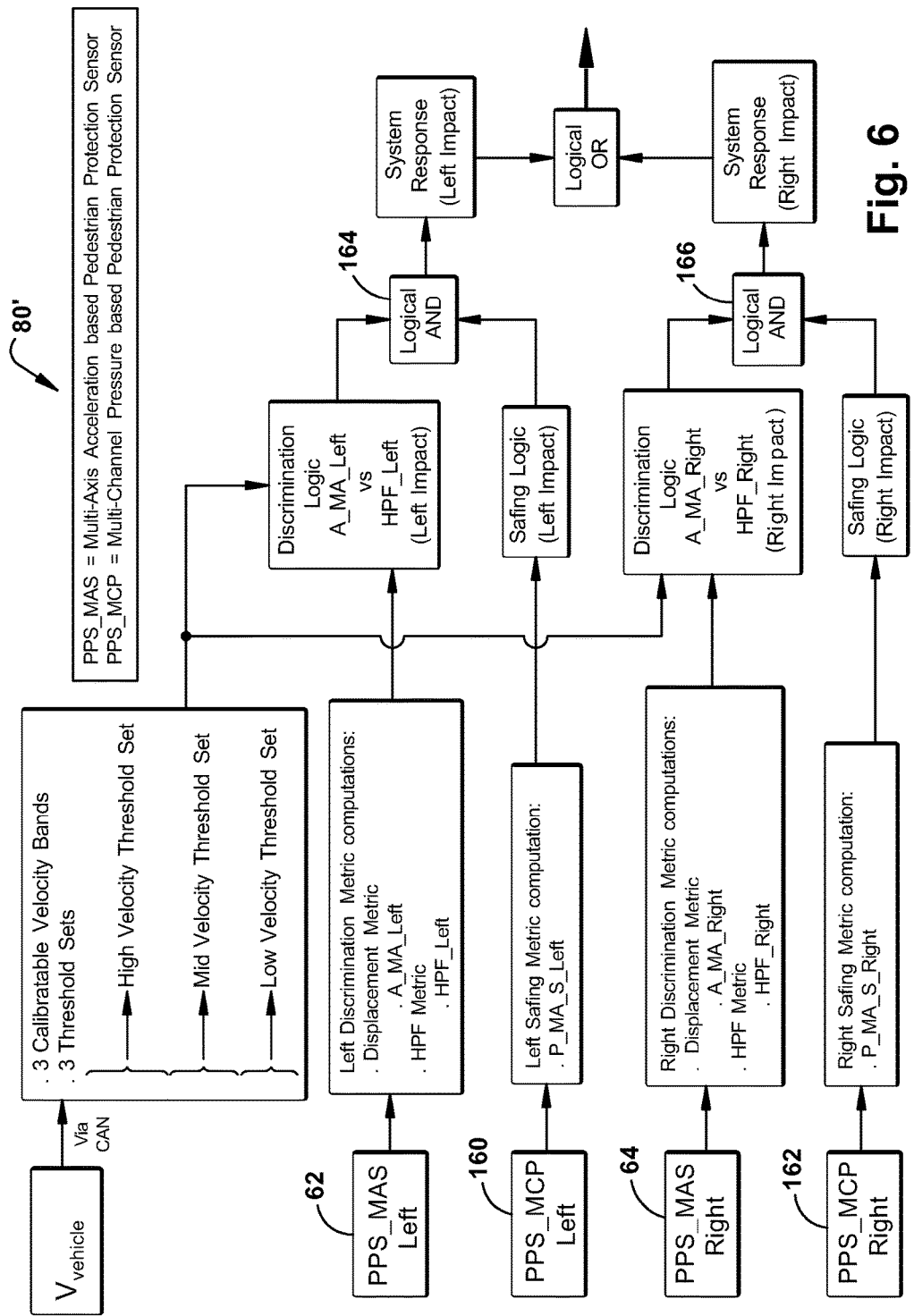
FIG. 6 is a functional block diagram showing a portion of the control logic used by the electronic control unit of FIG. 5 for detection of a vehicle/pedestrian impact.

Referring to FIG. 6, the control logic followed by the ECU 80' is depicted for the sensor architecture of FIG. 5. In this control arrangement, a pressure left safing determination is logically AND'ed with the left acceleration determination in AND function 164. Similarly a pressure right safing determination is logically AND'ed with the right acceleration determination in AND function 166. In effect, instead of a safing function using one pressure sensor, the arrangement of FIG. 6 provides separate left and right pressure safing determinations with the left pressure safing determination AND'ed with the left acceleration discrimination determination and the right pressure safing determination AND'ed with the right acceleration discrimination determination.

Figure 7:
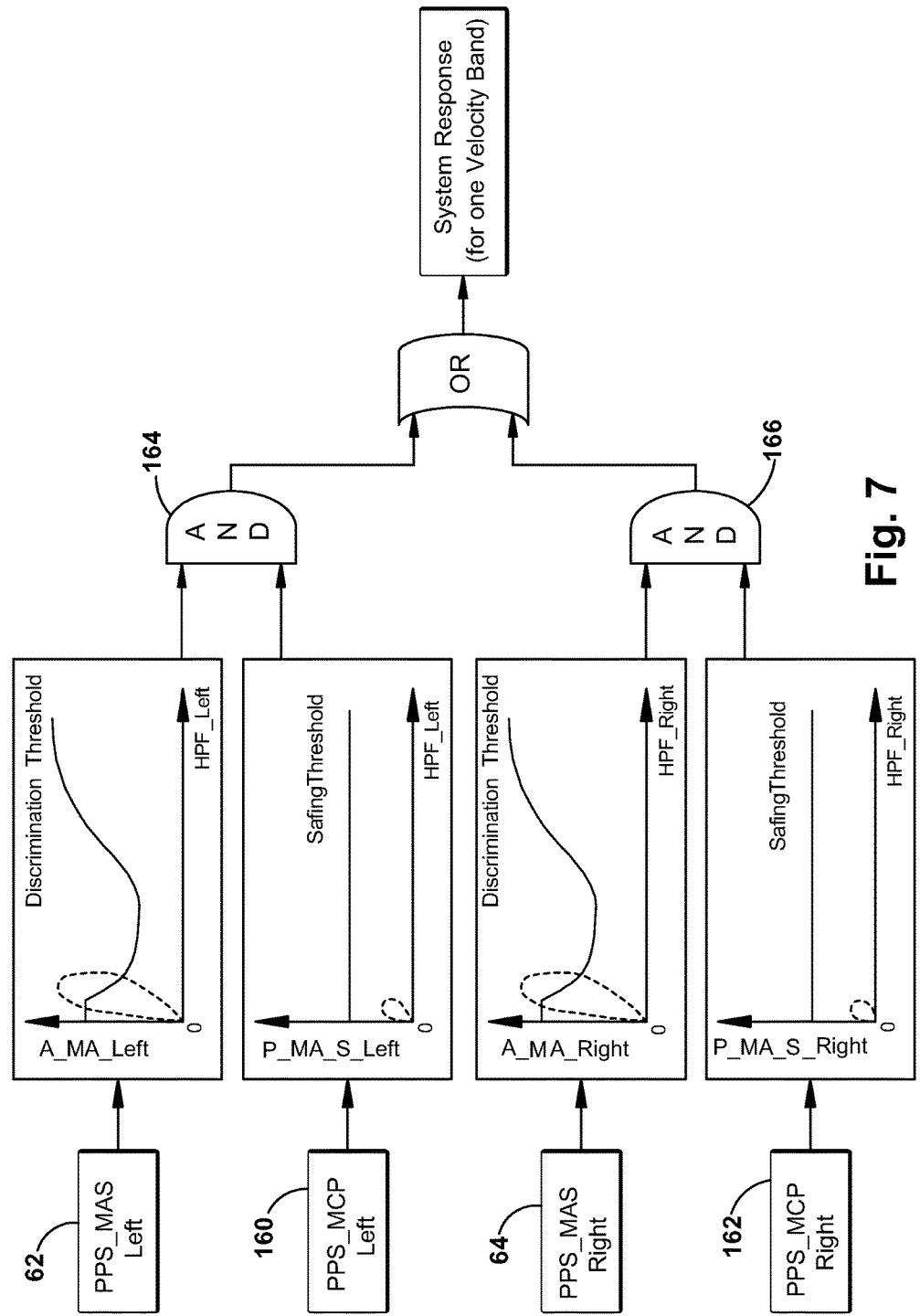
FIGS. 7-10 are block diagrams showing portions of discrimination control logic followed by the electronic control unit of FIG. 5 during different type of vehicle/pedestrian impact events.
Figure 8:
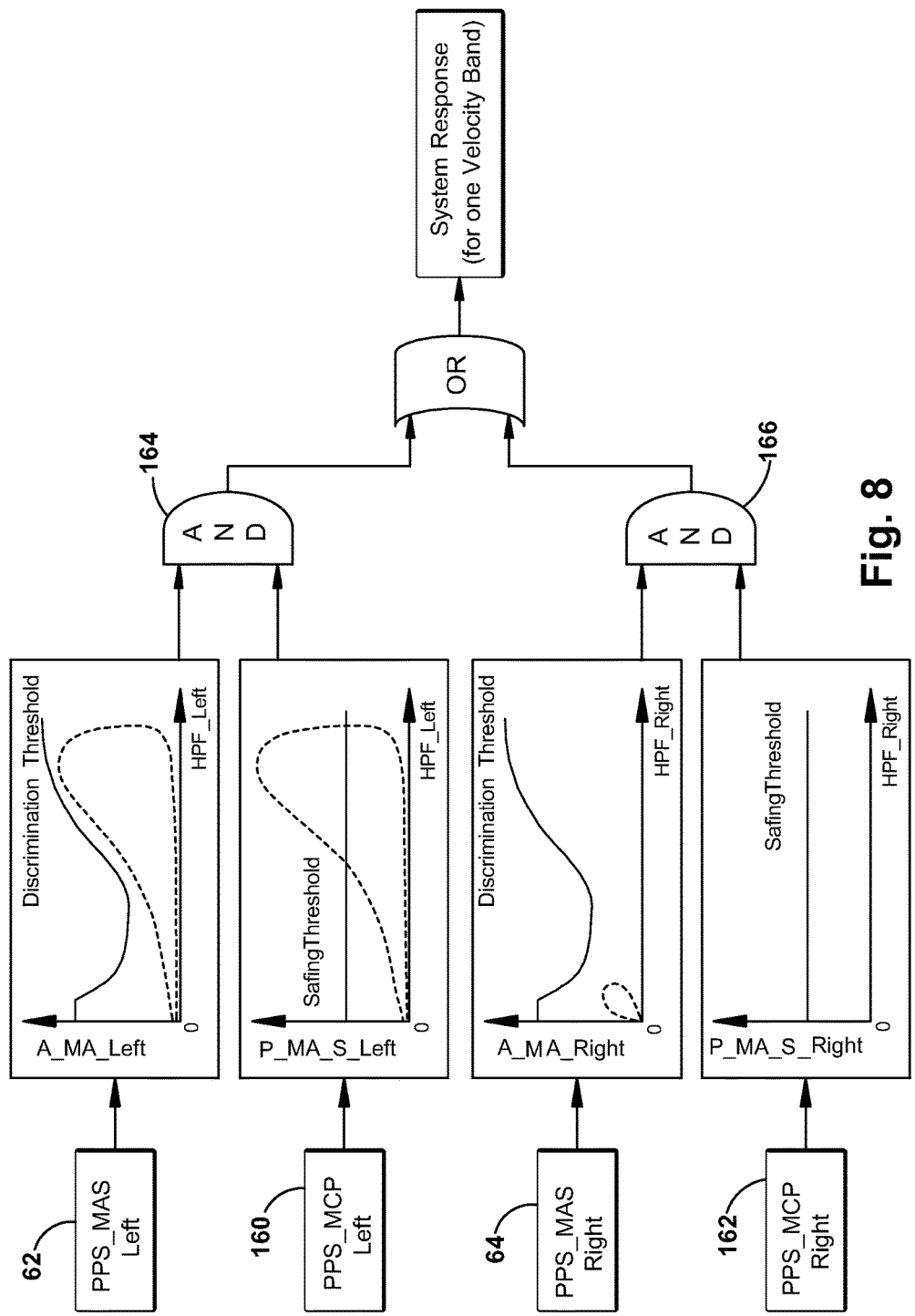
Figure 9:
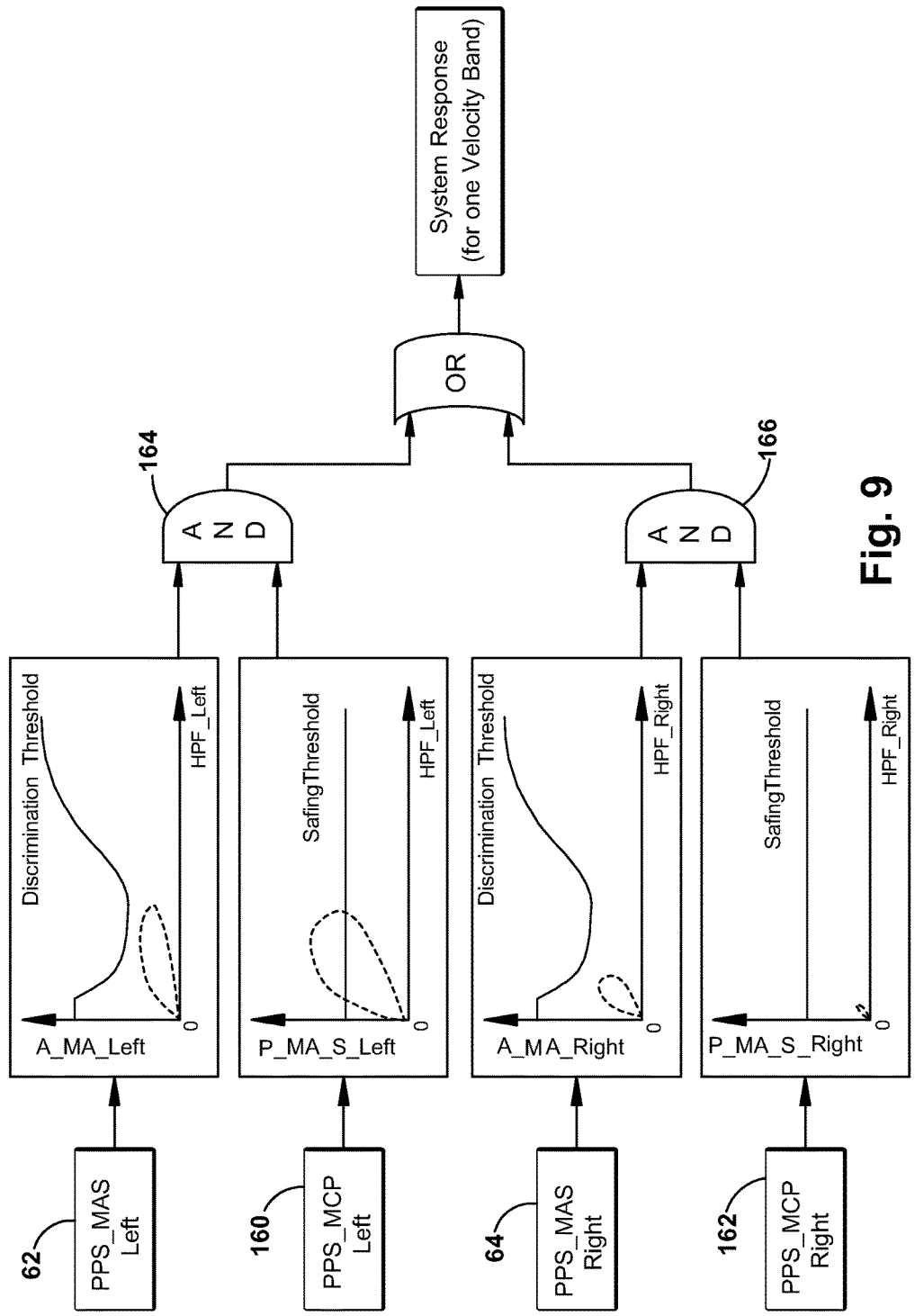
Figure 10:
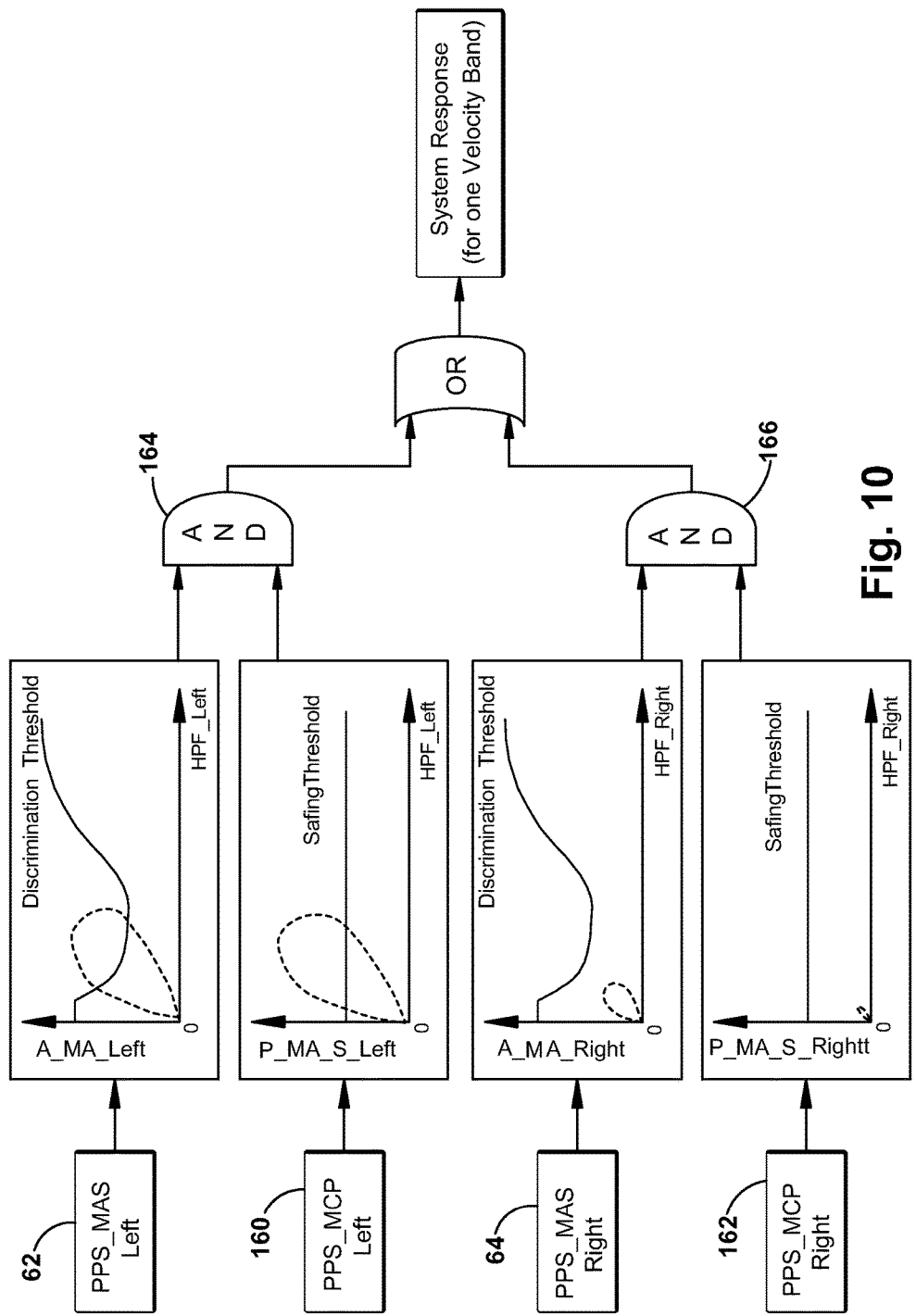

FIGS. 7-10 depict various example discrimination conditions for the vehicle sensor architecture shown in FIG. 5 using the control logic shown in FIG. 6. In particular, FIG. 7 depicts the affect of a severe rough-road misuse condition (a condition for which actuation of the actuators 86, 88 is not desired) when the vehicle velocity falls within one vehicle velocity band. As can be seen, since neither the left or right pressure safing values cross their associated threshold, no actuation of the actuators 86, 88 would occur. FIG. 8 depicts the affect of a left impact misuse condition (a condition for which actuation of the actuators 86, 88 is not desired) when the vehicle velocity falls within one vehicle velocity band. As can be seen, although the PPS_MCP Left exceeds its associated threshold, the left acceleration signal PPS_MAS does not exceed its threshold. Since neither the right pressure signal nor right acceleration signal exceed their associated thresholds, no actuation occurs of the actuators 86, 88. FIG. 9 depicts a no-fire left vehicle/pedestrian impact event in which the left pressure sensor PPS_MCP Left exceeds its associated threshold but the left acceleration sensor PPS_MAS does not exceed its associated threshold. FIG. 10 depicts a must-fire left vehicle/pedestrian impact event. As can be seen, since both the PPS_MAS Left acceleration exceeds its associated threshold and the left pressure PPS_MCP Left exceeds its associated threshold, the actuators 86, 88 would be actuated.

Figure 11:
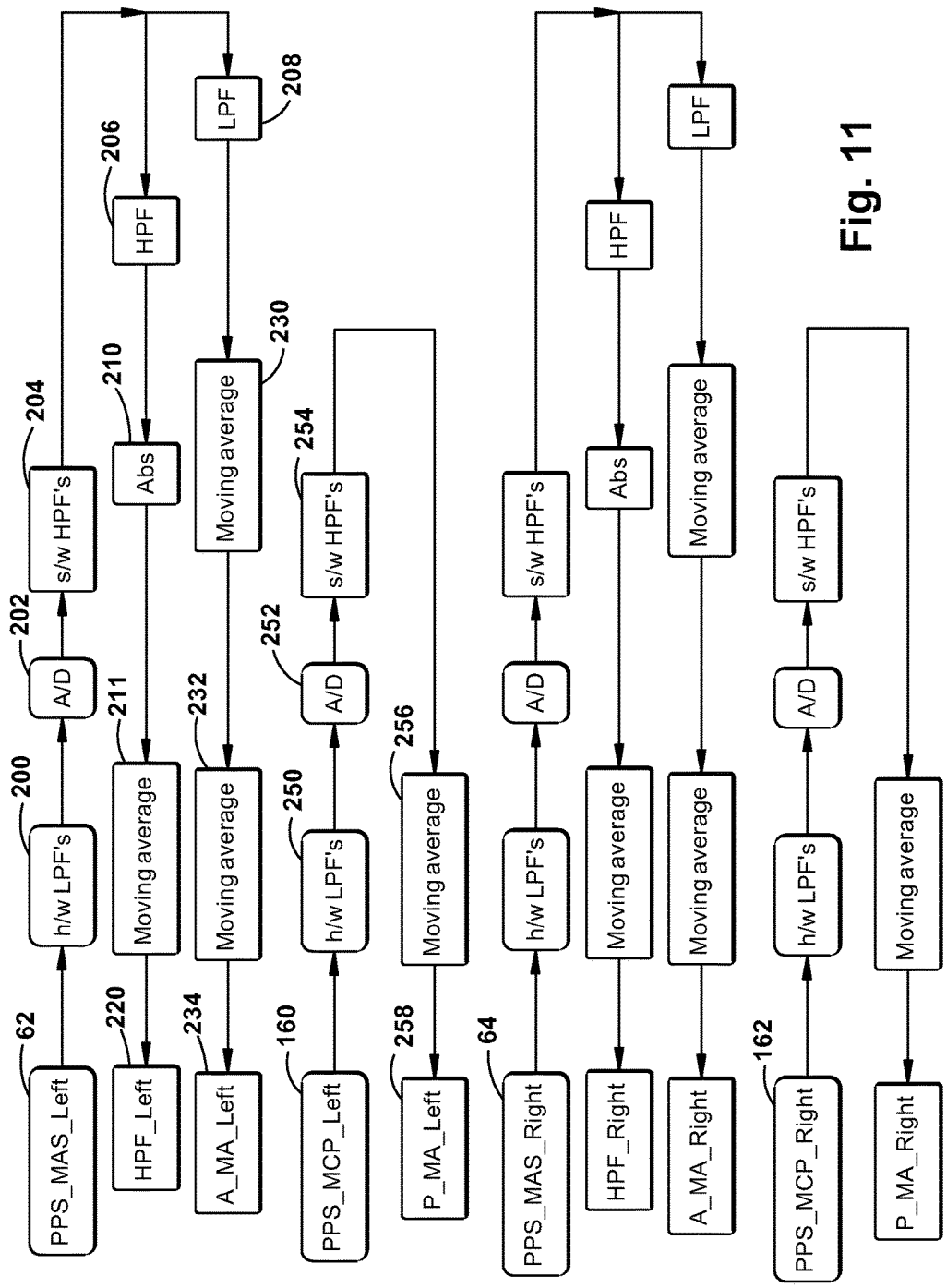
FIG. 11 is a block diagram showing another portion of the discrimination control logic of the electronic control unit of FIG. 5.

Referring to FIG. 11, the determination metric calculations for the sensor architecture shown in FIG. 5 and the control logic shown in FIG. 6 will be appreciated. Each of the acceleration sensors 62, 64 output an electrical signal having electrical characteristics such as frequency and amplitude indicative of a vehicle/pedestrian impact event resulting in acceleration of at least that portion of the vehicle where the sensors are mounted. Each sensor 62, 64 has its own associated metric calculation to determine displacement values over a time window and to determine an impact energy value based on impact energy over a particular frequency range. The controller 80' performs each of these metric calculations to determine associated displacement values and impact energy. The output signal PPS_MAS Left from the accelerometer 62 is low-pass filtered using, for example, a hardware filter 200 (anti-alias filter). The low-pass filter 200 passes a signal of a first frequency band, e.g., frequencies from 0-800 Hz. The filtered signal is converted to a digital signal using an analog-to-digital converter 202 for further processing by the ECU 80'. The ECU 80' then high-pass filters the signal using a high-pass filter 204 so as to remove any sensor bias (DC drift). The high-pass signal is then further high-pass filtered 206 to eliminate frequencies from DC-400 Hz where 400 Hz is a calibratable number. The output of HPF 206 contains frequency values between 400-800 Hz. The HPF 206 also eliminates signal characteristics the result from rough road events. A second high-pass filter can be cascaded to form a second order filter to obtain a sharper cutoff if so desired. An absolute value 210 of the high-pass filtered 206 signal is then determined using function 210. The absolute value of the filter acceleration signal is indicative of the impact energy based on the acceleration signal from the left acceleration sensor 62. A moving average A_MA of the absolute value of the signal is determined in function 211 for smoothing purposes. The resultant signal is a high-pass filtered signal 220, designated HPF_Left, and is indicative of impact energy within a particular frequency range (e.g., 400-800 Hz) of interest. This HPF_Left impact energy value is useful in determining the occurrence of a vehicle/pedestrian impact event.

The output of the filter 204 is also used to determine displacement values (double integral of acceleration) over a time window. Specifically, the output of the HPF 204 is low-pass filtered by a low-pass filter 208 so as to pass signals with a frequency between DC and 220 Hz, for example. The output of the LPF 208 is processed by a first moving average calculation function 230 (first integral) followed by a second moving average calculation function 232 (second integral) to arrive at a first displacement value 234 which is designated A_MA_Left.

Values for HPF_Right (impact energy right side) and A_MA_Right (displacement value right side) are similarly determined.

The pressure left value from hose 160 as detected by the pressure sensor 76' is low-pass filtered, using, for example, a hardware (that is, not software) filter 250, converted to a digital value using A/D converter 252 and high-pass filtered, by for example, a software high-pass filter 254. A pressure moving average value is determined using function 256 that provides the P_MA_Left moving average value 258 for further processing by the ECU 80'.

The P-MA-Right value is similarly determined.

Figure 12:
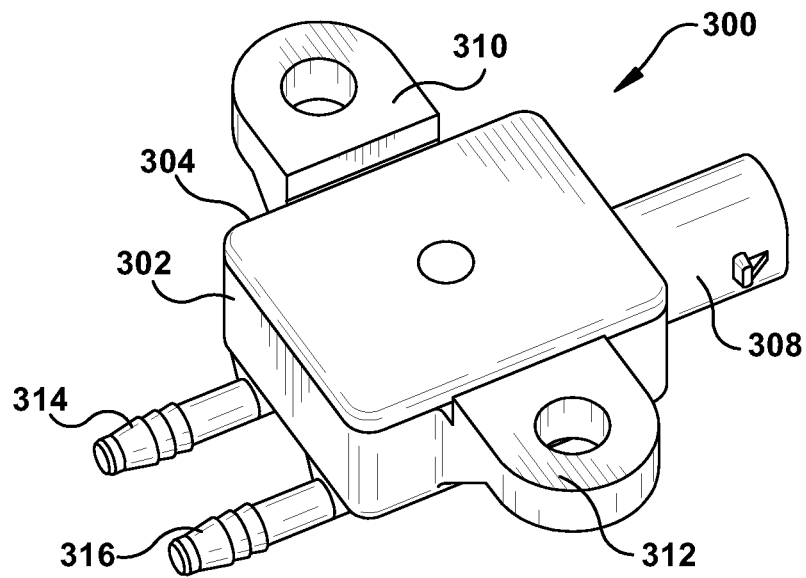
FIG. 12 is a perspective illustration of the multi-port pressure sensor used in the system of FIG. 5.
Figure 13:
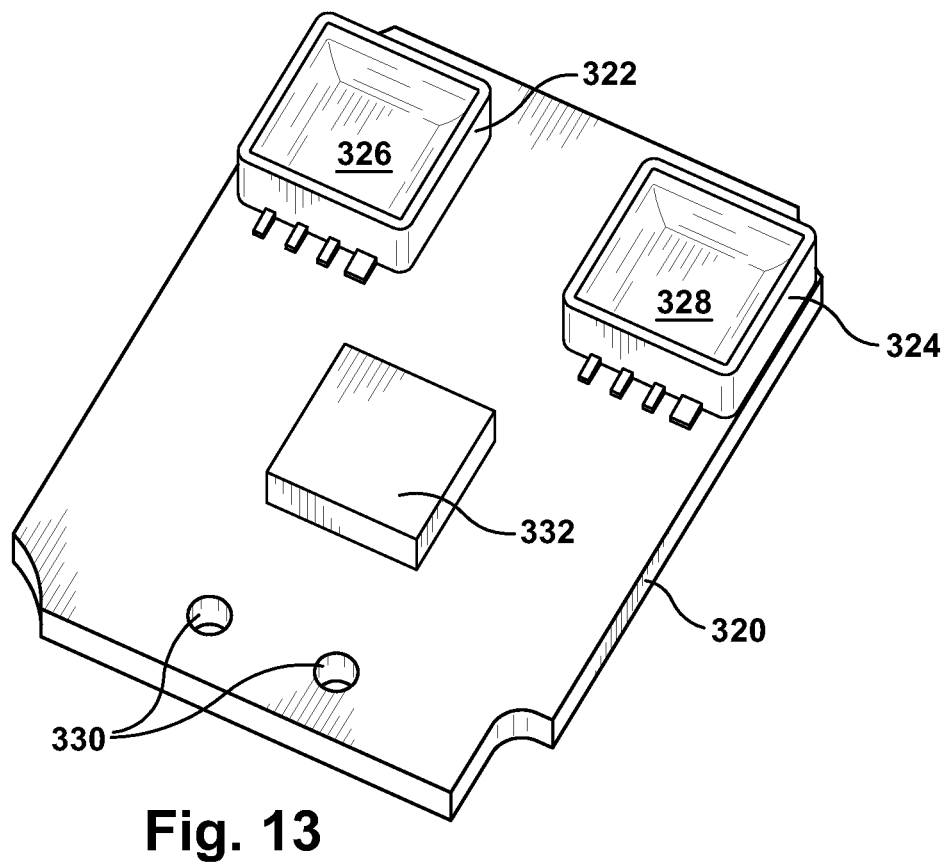
FIG. 13 is a perspective illustration of the printed circuit board of the pressure sensor of FIG. 12.
Figure 14:
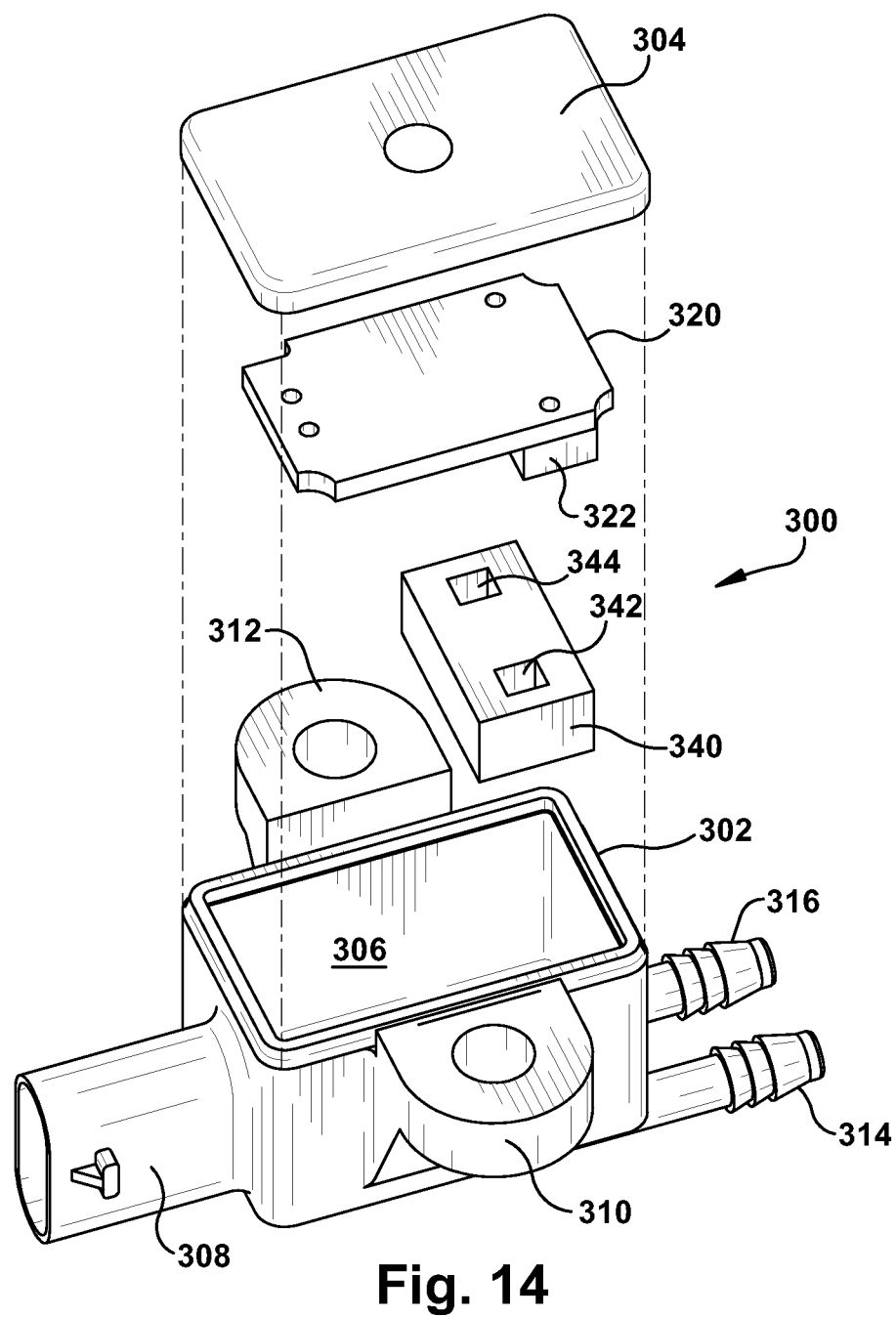
FIG. 14 is an exploded view of the pressure sensor of FIG. 12, showing the housing, the printed circuit board, and a sensor gasket.

As stated previously, the present invention relates to new type of pressure sensor, shown in detail in FIGS. 12 through 16, for use in a system such as shown, for example, in FIG. 5. As shown in FIG. 12, the new pressure sensor 300 has multiple ports and a single connector for connection to other electrical components of the system. The sensor 300 has a housing including a molded fiber-reinforced plastic ("FRP") base 302 and a molded FRP cover 304. As best seen in FIG. 14, the base 302 has four generally rectangular perimeter walls and a rectangular floor which together define a central cavity or hollow 306 for receiving the components of the sensor. Several features project from the base including a connector shroud 308, mounting tabs 310 and 312, and two pressure ports 314 and 316.

The connector shroud 308 encloses multiple electrically conductive connector pins, molded into the base 302 and projecting into the hollow central portion of the shroud for mating with a suitable matching female wiring harness connector. The pins, which are not visible in the figures, terminate within the cavity 306 in compliant pin features for ease of connection to the printed circuit that mounts in the housing. The pins bend at right angles upon emerging into the interior of the cavity 306 through the perimeter wall, whereby the compliant pin features project upward (as viewed in the figures) towards the open top of the base 302.

The mounting tabs 310 and 312 are robust, rigid elements designed to enable a firm, vibration-free mounting of the pressure sensor to the frame of the vehicle to which the sensor will be mated. The rigidity of the mounting is particularly important because, as will be described hereinafter, one or more acceleration sensors will be installed in the housing and it is therefore important that motion of the housing (and thus the acceleration sensors) closely follow the actual motion of the frame of the vehicle. The tabs 310 and 312 project from opposite sides of the housing base and have respective holes through which mounting bolts (not shown) will be driven to secure the sensor to a vehicle frame.

Pressure ports 314 and 316 are generally tubular in nature and include barbed nipples over which pressure sensing hoses, e.g., hoses 160, 162 of the embodiment of FIG. 5, will be press-fit to form air-tight seals and fluid communication (specifically, free flow of gas) between the hollow centers of the ports and the hollow center of the hoses. The pressure ports guide the gas from the hoses along respective paths into the heart of the sensor 300.

The central cavity of the sensor 300 contains a planar, generally rectangular printed circuit board 320 that serves as a mounting surface and interconnection device for multiple sensors. As shown in FIG. 13, the printed circuit board 320 has mounted thereon two integrated circuit pressure sensors 322 and 324. Sensors suitable for use as pressure sensors 322 and 324 are available on the open market and include, for example, the Infineon KP200 pressure sensor and the Elmos E524.40 pressure sensor. Such devices typically include a flexible membrane-type pressure sensor element and supporting signal processing and communication circuits. The sensing port of such devices is typically found on the top of the device package (i.e., the side opposite the side that rests on the printed circuit board). Thus, the sensing ports for pressure sensors 322 and 324 are found on the upper faces 326 and 328, respectively, of the sensor packages.

The printed circuit board 320 carries electrical circuit traces that connect the various devices mounted on the board to plated-through-holes 330. In the embodiment being described only two such connections are required because all of the devices on the printed circuit board 320 are connected to a common pair of data/power lines. The devices receive power from the shared lines and also communicate with the ECU 80' (see FIG. 5) via such shared lines using multiplexing (time-division multiplexing, generally, although other multiplexing schemes are also feasible) or a polling arrangement. Although only two plated through holes 330 are used in the embodiment being described presently, in fact there will be as many such holes as are required to provide contacts between the connector pins and the circuit traces on the printed circuit board 320.

When the printed circuit board 320 is installed in the base 302 of the housing, the sensor package faces 326 and 328 will face down (as shown in the figures) towards the base surface bearing the pressure ports 314 and 316. The compliant pins previously described will project through the plated-through-holes 330, biting into the electrically conductive material surrounding the plated-through-holes. The complaint pins will thus form tight and reliable electrical connections between the connector pins and the circuit traces on the printed circuit board, and thus to the sensors mounted on the printed circuit board.

As best seen in FIG. 13, the printed circuit board 320 further carries an additional sensor element, in this case a multi-axis acceleration sensor 332. This sensor may augment (or possibly replace, in suitable circumstances) the sensors 62 and 64 shown in and described with respect to FIGS. 1 and 5. By combining multiple sensors in a unified package (two pressure sensor and also an acceleration sensor in the illustrated embodiment) the complexity of the mounting and interconnection arrangement is significantly simplified and improved.

Figure 15A:
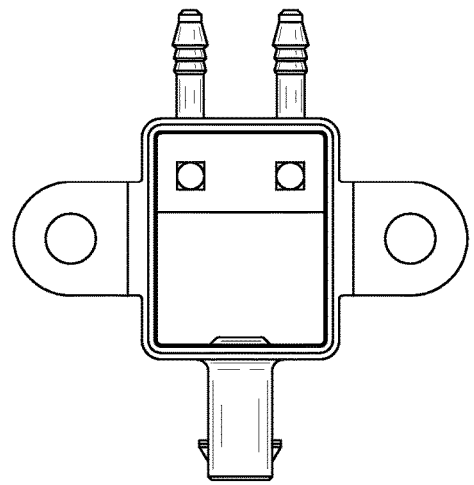
FIG. 15 illustrates two different gasket arrangements that may be employed with the sensor of FIG. 12.
Figure 15B:
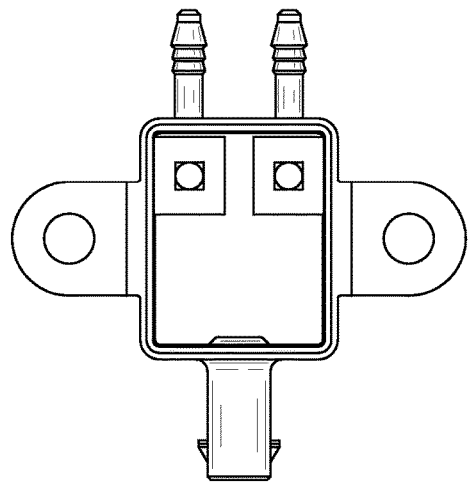

The connection between the sensor faces 326 and 328 and their respective pressure ports 314 and 316 must be gas-tight to permit the pressure pulse from the hoses to be transmitted properly to the sensors 322 and 324. To this end, a sensor gasket 340 is provided that will be installed between the housing base 302 and the printed circuit board 320. The gasket 340 has formed thereon passages 342 and 344, spaced apart by the same distance as the sensor faces 326 and 328. This spacing in turn matches the spacing between the interior orifices of the pressure ports 314 and 316. The gasket and printed circuit board will be inserted into housing base 302 in proper alignment to register the sensor faces 326 and 328 with gasket passages 342 and 344, which will in turn be registered with the interior orifices of the pressure ports 314 and 316, to thereby create the requisite gas-tight connection. The gasket 340 will preferably be formed as a single element as shown in FIG. 14 and FIG. 15(*a*), however it could instead be formed as plural individual gasket elements, with one gasket for each pressure port/sensor combination as shown in FIG. 15(*b*).

Once the gasket 340 and printed circuit board 320 have been installed in the base 302 of the housing, the cover 304 will be fused to the top of the housing via laser welding, a suitable adhesive, or some other method. The printed circuit board 320 will be supported in the housing by thin crushable ribs (not separately shown) molded on the interior surface of the base and cover of the housing. The wedging of the board between the crushable ribs, as well as the mechanical support provided by the compliant pins, insures that the printed circuit board is fixed and immobile within the housing.

Figure 16A:
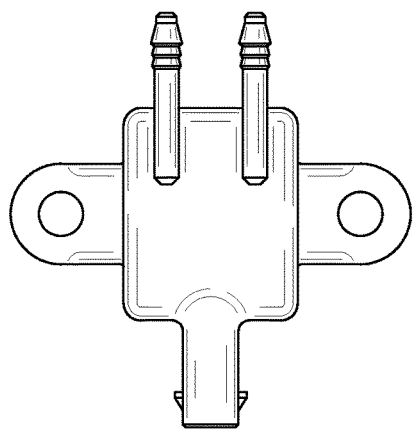
FIG. 16 shows embodiments of the present invention utilizing alternative arrangements of pressure ports.
Figure 16B:
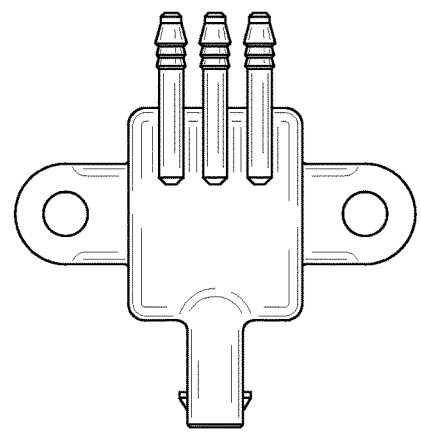
Figure 16C:
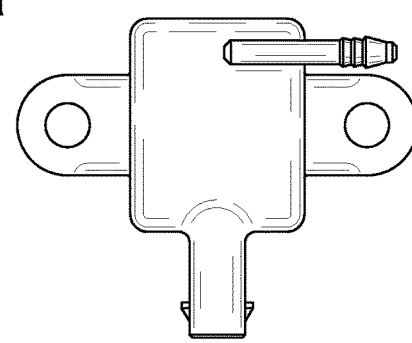

The system as thus described is flexible in application and may be readily modified to fit the needs of alternate systems. For example, the housing could be designed to hold more than two pressure sensors, with suitable changes in the numbers of the pressure ports, gaskets, and, if necessary, connector pins. As shown in the examples of FIG. 16, the base of the housing could be reconfigured from the illustrated configuration (repeated again in FIG. 16(*a*)) to provide a greater number of pressure ports, such as three pressure ports as shown in FIG. 16(*b*). The housing could also be configured to have the pressure ports project away from the housing in different directions, including directions opposite from one another, e.g. left/right, forward/backward, up/down, or any combination thereof. Further, the ports could emerge from the housing base pointed in the same direction but with the two ports stacked one atop the other as shown in the example of FIG. 16(*c*). In a stacked pressure port embodiment, the pressure sensors may still preferably be mounted on the same surface of the printed circuit board, however the routing of the pressure communication passages would need to run both vertically and horizontally (using those terms with respect to the FIG. 14 orientation of the multiport sensor).

Figure 17:
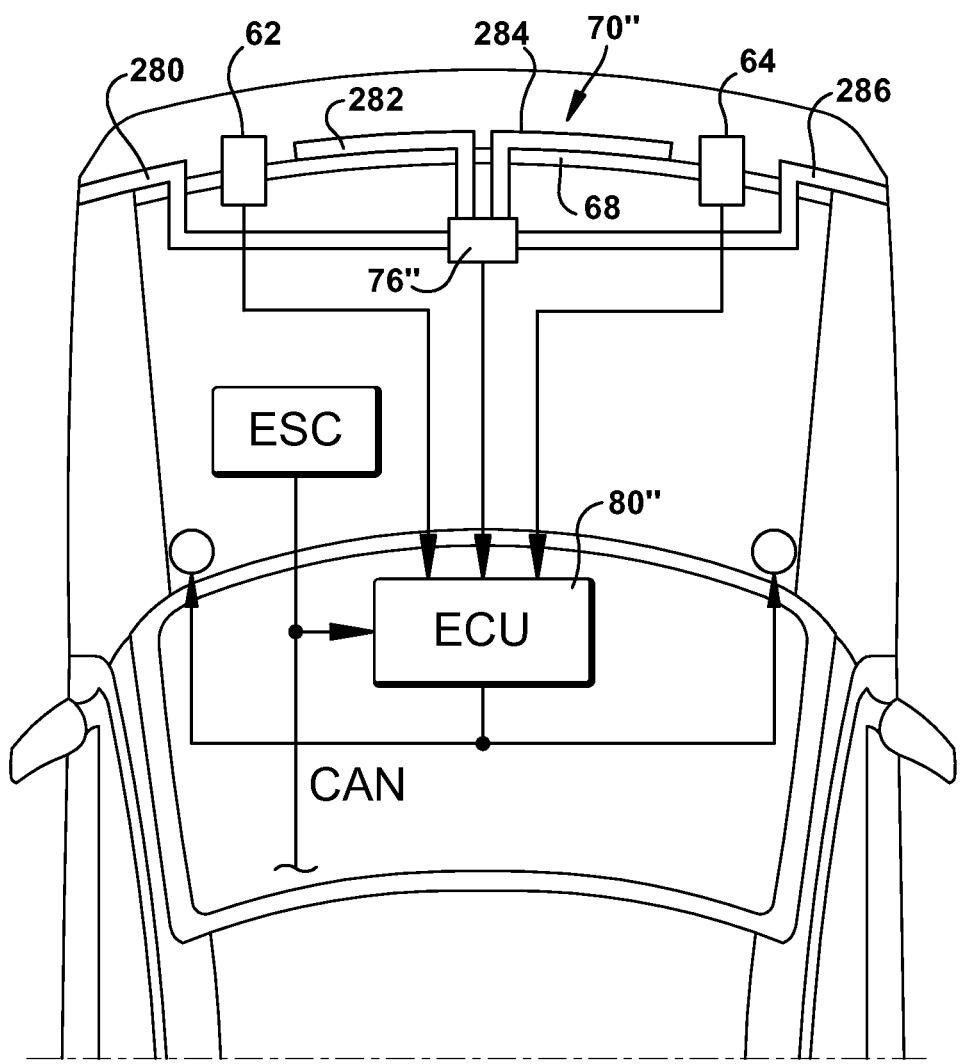
FIG. 17 illustrates a vehicle/pedestrian impact detection device in accordance with yet another exemplary embodiment of the present invention.

FIG. 17 shows a system employing a multiple port pressure sensor having four different ports in the same housing. In the Figure, the acceleration sensors 62, 64 are mounted to the cross-member 68 as previously described. The pressure sensor 70", however, is a device having a single housing, as described, but including a multi-channel pressure ("PPS_MCP") sensor 76" having multiple pressure hoses connected thereto. The pressure sensor 76" is in this example embodiment a four channel pressure sensor. A pressure hose 280 is mounted to the far left portion of the bumper structure, a pressure hose 282 is mounted to the left center portion of the bumper structure, a pressure hose 284 is mounted to the right center of the bumper structure, and a pressure hose 286 is mounted to the far right portion of the bumper structure. With this arrangement, the left and right sides of the bumper each have two pressure signals that are used by the ECU 80" for a vehicle/pedestrian impact analysis in a manner similar to described above. With this structure, the pressure signals detected from the two left pressure hoses could be either AND'ed or OR'ed to provide a left side pressure safing determination. Similarly, the pressure signals detected from the two right pressure hoses could be either AND'ed or OR'ed to provide a right side pressure safing determination. The resultant pressure safing determinations could be AND'ed with the associated side discrimination determinations based on the associated acceleration signal evaluations.

Multiple port pressure sensors in accordance with the present invention provide the advantages of multiple shorter hoses disposed across the bumper. This arrangement allows more sensitive discrimination of an impact to the bumper since the system will have a larger change in proportionate hose volume, and thus in ΔP/P, while also allowing localization of the impact on the bumper via the separate sensing of impacts on different regions of the bumper.

The system in accordance with the present invention reduces the complexity in the vehicle by reducing the number of modules used, since the pressure sensing in multiple hoses will be performed by a single module. The number of vehicle wiring harnesses that will be needed to connect the satellites to the ECU will be reduced too, since the sensors can be connected in a bus configuration. This simplified system also reduces the use of other additional hardware (e.g., screws, brackets).

The inclusion of a multi-axis acceleration sensor in the same package will permit more accurate detection of an impact on the bumper, and will also reduce even more the number of modules used.

The multiple port pressure sensor can have as many ports as needed for all the hoses/membranes used. These ports can be oriented in any angle or direction required to fit the vehicle/system requirements. Multiple ports can be sealed using single or multiple gaskets.

It should be appreciated that the present arrangement improves vehicle/pedestrian impact sensing performance by providing a fast time to deploy with a good margin against misuse and rough-road conditions. The acceleration sensors provide sensing capabilities (e.g., frequency and amplitude) in discriminating different types of impact events, while the pressure sensor(s) provide a further vehicle/pedestrian impact discrimination sensor that improves the system robustness by effectively providing a filter against other types of non-impact vehicle events such as experienced during rough-road conditions.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for detecting an impact of a pedestrian or other object on a bumper of a vehicle, comprising:
   a plurality of closed, gas filled hoses, each said hose disposed proximal to said vehicle bumper and extending along the long dimension of said bumper, each said hose having a sensing end and a non-sensing end, with the sensing ends of all said hoses disposed in proximity to one another;
   a plurality of gas pressure sensors, each sensor operatively attached to the sensing end of an associated one of said plurality of hoses;
   a housing for supporting said plurality of gas pressure sensors in proximity of said bumper, said housing having a closed chamber and a plurality of pressure ports, each of said pressure ports being associated with a corresponding one of said gas pressure sensors; and
   a sensor gasket having a plurality of passages extending therethrough, each of said passages providing fluid communication between one of said pressure ports and its corresponding pressure sensor.

2. Apparatus as set forth in claim 1, wherein said housing comprises a single electrical connector disposed thereon for providing communication between said plurality of gas pressure sensors and other systems in said vehicle.

3. Apparatus as set forth in claim 2, and further comprising an at least one accelerometer also contained within said housing, wherein said single electrical connector also provides communication between said at least one accelerometer and other systems in said vehicle.

4. Apparatus as set forth in claim 3, wherein said housing includes mounting tabs configured to provide robust, stable attachment of said housing to said vehicle suitable for communication of acceleration signals from said vehicle to said at least one accelerometer via said mounting tabs.

5. Apparatus as set forth in claim 1, wherein said plurality of closed, gas filled hoses comprises two hoses extending away from said housing in opposite directions parallel to said bumper, such that said hoses extend over a distance that is substantially the combined length of both hoses and such that said non-sensing ends of said hoses are distal from one another.

6. Apparatus as set forth in claim 5, wherein said two hoses are of generally equal length, whereby said sensing ends and hence said gas pressure sensors are disposed approximately of the midpoint of the total distance covered by said two hoses.

7. Apparatus as set forth in claim 1 and further comprising a printed circuit board mounted in said housing, each of said plurality of gas pressure sensors being mounted on the same side of said printed circuit board such that said pressure sensors face the same side of said housing.

8. Apparatus as set forth in claim 1, wherein said housing includes a base and a cover connectable to the base to close the chamber, said cover being configured to compress said gasket when connected to said base so that said fluid communication between each sensor and its corresponding pressure port is air-tight.

9. Apparatus for use in detecting an impact of a pedestrian or other object on a vehicle, comprising a closed housing, a printed circuit board fixed in said closed housing, at least two pressure sensors mounted on said printed circuit board such that said pressure sensors each face the same side of said closed housing, an electrical connector accessible external to said housing for providing electrical communication between said printed circuit board and other electrical systems external to said housing, and at least two pressure ports formed on said housing, each port being in gas communication with a respective one of said at least two pressure sensors and also adapted for connection to impact sensing hoses external to said housing whereby pressure changes in said hoses will be communicated to said pressure sensors via said ports.

10. Apparatus as set forth in claim 9, and further comprising at least one acceleration sensor also disposed on said printed circuit board, and mounting features on said housing for facilitating stable, robust mounting of said housing on a vehicle, wherein electrical communication to said at least two pressure sensors and said at least one acceleration sensor is provided via said electrical connector.

11. An apparatus for detecting a vehicle/pedestrian impact comprising:
at least one acceleration sensor mounted near a forward location of a vehicle for providing an associated acceleration signal indicative of an impact event;
at least one multi-channel pressure sensor having a plurality of pressure hoses connected thereto, the plurality of pressure hoses being mounted at associated different locations along a forward structure of the vehicle, each pressure hose providing an associated pressure indication to the multi-channel pressure sensor of an impact event, the multi-channel pressure sensor providing an associated electrical signal indicative of an impact event encountered by any of the pressure hoses; and
a controller for determining if a vehicle/pedestrian impact event has occurred in response to the acceleration signal and the associated electrical signal from the multi-channel pressure sensor and for providing an actuation control signal in response thereto;
wherein the at least one multi-channel pressure sensor includes a housing having a printed circuit board mounted therein and a plurality of pressure sensors mounted to said printed circuit board, each pressure hoses being operatively coupled to an associated one of the pressure sensors mounted on said printed circuit board.

12. The apparatus of claim 11 further including an acceleration sensor mounted to said printed circuit board.

13. The apparatus of claim 11 wherein said housing includes a cover having a plurality of pressure ports, each pressure port being connected to an associated one of said pressure sensors mounted on said printed circuit board.

14. Apparatus for use in detecting an impact of a pedestrian or other object on a vehicle, comprising:
at least two gas filled pressure sensing hoses, each of said pressure sensing hoses being disposed proximal to said vehicle bumper and extending along the long dimension of said bumper;
a housing comprising a base defining a cavity and a cover connectable to said base to close said cavity;
a printed circuit board fixed in said cavity;
at least two pressure sensors mounted on said printed circuit board;
wherein the housing further comprises at least two pressure ports, each of said pressure ports being associated with one of the pressure sensing hoses; and
at least one sensor gasket comprising at least two gasket passages extending therethrough, said at least one sensor gasket being disposed within the cavity and between the housing and the printed circuit board so that each of said gasket passages provides fluid communication between one of said pressure sensors and a corresponding one of said pressure ports.

15. Apparatus as set forth in claim 14, wherein said at least two pressure sensors are mounted on said printed circuit board such that said pressure sensors each face the same side of said housing.

16. Apparatus as set forth in claim 14, wherein said housing further comprises an electrical connector fitting accessible external to said housing for providing electrical communication between said printed circuit board and other electrical systems external to said housing.

17. Apparatus as set forth in claim 14, wherein the cover, when connected to said base, compresses said sensor gasket between said printed circuit board and said housing.

18. Apparatus as set forth in claim 17, wherein said sensor gasket comprises a first surface compressed against said pressure ports and a second surface compressed against said sensors.

19. Apparatus as set forth in claim 14, wherein said fluid communication between one of said pressure sensors and a corresponding one of said pressure ports is air-tight.

* * * * *